July 30, 1968   M. SHOELD   3,395,010
RECLAMATION OF LEAD-ACID STORAGE BATTERIES
Filed July 20, 1967
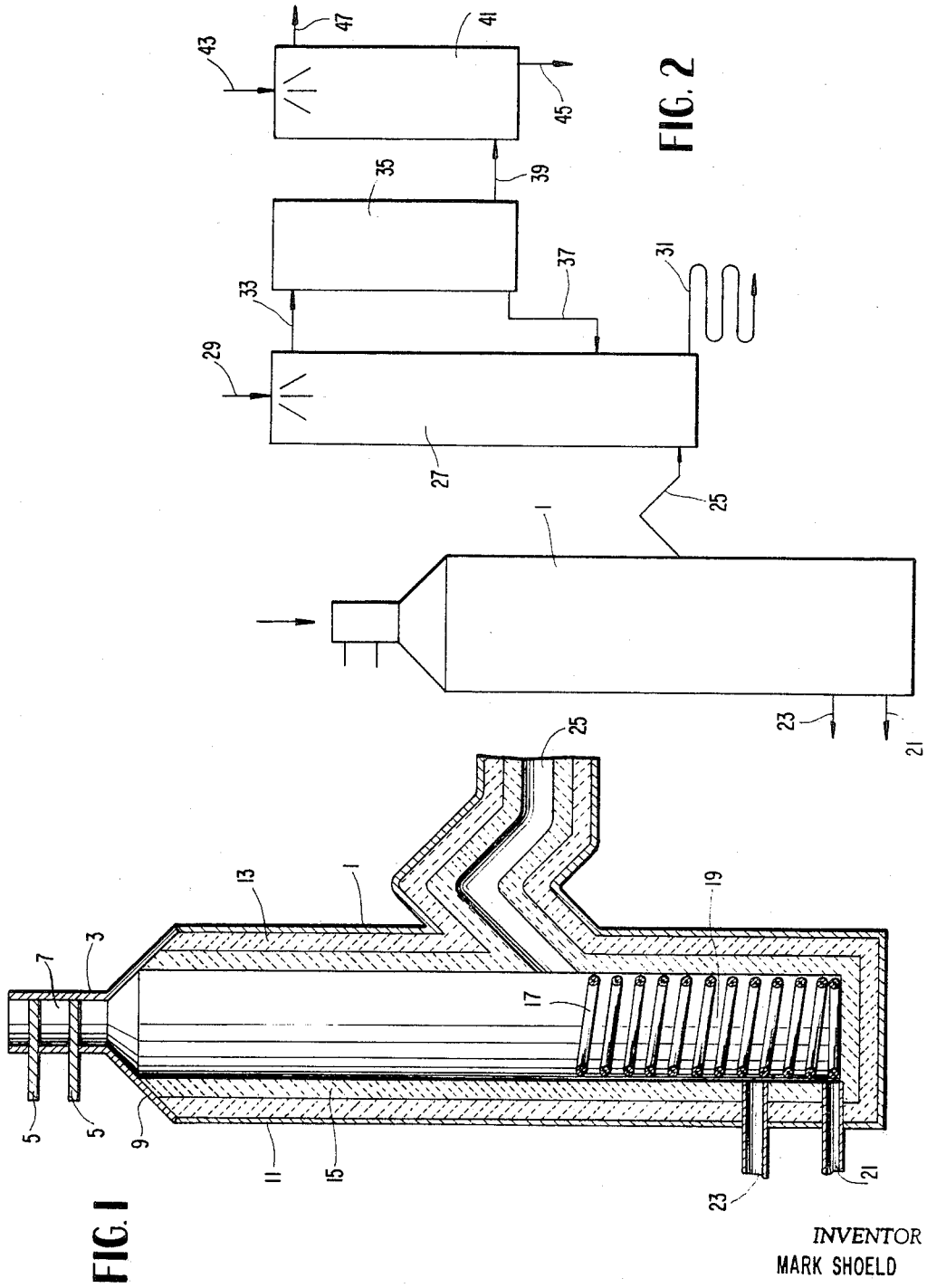
INVENTOR
MARK SHOELD
BY Young + Thompson
ATTORNEYS

United States Patent Office 3,395,010
Patented July 30, 1968

3,395,010
RECLAMATION OF LEAD-ACID
STORAGE BATTERIES
Mark Shoeld, 2140 E. Graves Ave.,
Orange City, Fla. 32763
Filed July 20, 1967, Ser. No. 654,739
7 Claims. (Cl. 75—10)

ABSTRACT OF THE DISCLOSURE

Lead-acid storage batteries are reclaimed, which are constituted by a laminar construction of cellulosic paper, lead foil and lead oxide and/or lead sulfate with sulfuric acid, substantially free from antimony. The carbon of the paper is present in approximately stoichiometric amounts to reduce the lead compounds, and the materials are heated out of contact with the atmosphere to about 800° F., which is above the melting point of lead and the dissociation temperature of sulfuric acid. Molten metallic lead is tapped off and the exit gases are water vapor and sulfur trioxide and carbon dioxide, from which useful values may be recovered.

---

The present invention relates to the reclamation of lead-acid storage batteries, and is concerned with the recovery not only of reuseable lead but also sulfur trioxide and/or sulfuric acid, and perhaps also carbon dioxide. The invention is useful not only for the reclamation of these materials from used lead-acid batteries, but also for the reclamation of materials from scrapped or defective batteries such as batteries which do not pass inspection. The invention is particularly useful with batteries of the type disclosed in my copending application, Ser. No. 637,219, filed May 9, 1967.

The storage batteries disclosed in that copending application are constituted by a rolled-up construction, in which layers of lead foil and lead peroxide are supported by and disposed between layers of kraft paper rendered acid-proof by the inclusion of a small amount of rubber latex, and the roll is soaked with sulfuric acid. After use, the battery is characterized by less metallic lead and is also characterized by the presence of lead sulfate. But whether or not the battery is new or used, it is characterized by the presence of a member selected from the class consisting of lead oxide and lead sulfate, in addition to the sulfuric acid, lead and paper.

According to the present invention, these and other lead-acid batteries are reclaimed by feeding cellulosic paper, lead and sulfuric acid and at least one member selected from the class consisting of lead oxide and lead sulfate, from lead-acid storage batteries, to a reaction zone in the substantial absence of antimony, heating the said materials in the reaction zone to a temperature to promote the reduction of the lead compound and the dissociation of sulfuric acid, shielding the reaction zone from the entry of ambient oxidizing gases, and separately removing from the reaction zone molten lead, on the one hand, and a gaseous mixture of water vapor and carbon dioxide and sulfur trioxide, on the other hand.

The presence of antimony is avoided so as to avoid the necessity of dealing with lead-antimony alloys of high melting point. Antimony is often alloyed with the lead of storage battery plates to give them physical strength; but when dealing with paper-supported lead foils and lead compounds as in the above-identified copending application, and in various other environments, the use of antimony is unnecessary.

The heat is preferably supplied by electric resistance heating, so as to avoid contact of the materials with oxidizing gases. The carbon in the cellulosic paper is preferably present in an amount approximately stoichiometric to reduce the lead compounds. The removed gaseous mixture is then preferably directed to a wash zone, where it is washed with water; and prior to introduction into the wash zone, the removed gaseous mixture is maintained at a temperature above the dissociation temperature of sulfuric acid so as to avoid the reformation of sulfuric acid outside the wash zone. The battery materials are preferably initially treated in a closed vertical column in which they move downwardly by gravity and progressively increase in temperature. The reaction zone is at the bottom of the column and the gases are withdrawn from a point contiguous to the reaction zone, to maintain their high temperature. A substantial quantity of material is maintained in the column above the reaction zone, but at a temperature below the reaction zone temperature, so that this material is thus preheated.

Accordingly, it is an object of the present invention to provide a method for reclaiming lead-acid battery material, which produces a minimum of slag or dross.

Another object of the present invention is the provision of such a method, in which gaseous materials may be recovered in high purity and high concentration.

Still another object of the present invention is the provision of such a method, which may be practiced in simple equipment with a minimum number of operational steps.

Finally, it is an object of the present invention to provide such a method, which will be relatively simple and inexpensive to practice, and easy to control, and which results in maximum reclamation of materials at minimum cost.

Other objects and advantages of the present invention will become apparent from a consideration of the following disclosure, taken in connection with the acompanying drawing, in which:

FIGURE 1 is a partly schematic cross-sectional elevational view of a furnace in which the present invention may suitably be practiced; and FIGURE 2 is a process diagram showing a cycle of operation according to the present invention.

Referring now to the drawing in greater detail, there is shown a furnace 1 of the upright shaft type, whose upper end 3 is reduced in diameter for the reception of the lead-acid battery materials to be reclaimed. A pair of vertically spaced horizontally sliding gates 5 define between them a hopper portion 7 of the furnace. With the upper gate 5 open and the lower gate 5 closed, material is introduced into the hopper portion 7. The upper gate 5 is then closed and the lower gate 5 is opened to transfer the material by gravity to the top of the furnace. In operation, the furnace is kept substantially full. Atmospheric air or other oxidizing gases are thus largely excluded from the furnace.

The reduced upper end 3 of the furnace then tapers downwardly outwardly in the form of a substantially conical hood 9 which at its lower end is of the same diameter as a vertical cylindrical shell 11. The portions of the furnace thus far described are metallic and preferably of stainless steel. Alternatively, they may be lead-lined steel, or of any other material which presents an inner surface that is inert to hot sulfuric acid vapor.

Shell 11 forms a support for refractory linings in the form of an outer lining of insulating brick 13 and an inner lining 15 of acid-proof brick. The linings 13 and 15 cover not only the side walls but also the bottom of furnace 1.

Disposed in a lower portion of furnace 1 are electric resistance heating elements 17 of Nichrome or the like, heated by a source of electric current (not shown), which define within their confines a reaction zone 19 which is the highest temperature portion of furnace 1. Material introduce into the furnace thus moves by gravity downwardly through the length of the furnace, rising in temperature as it goes, until it reaches the highest temperature in the reaction zone, which is preferably a temperature about 800° F., and in any event is above the melting point of lead and the dissociation temperature of sulfuric acid, which under the contemplated circumstances is each about 560° F. The top of the furnace, by contrast, is at a temperature of about 150°–200° F. The furnace is operated under a slight negative pressure, to prevent the escape of potentially corrosive gases.

In the reaction zone 19, the lead oxide or lead sulfate is reduced by the carbon of the cellulosic paper. The molten lead thus produced is tapped through conduit 21, while any dross or slag may be tapped through a conduit 23.

The carbon is present in about a stoichiometric amount for this reduction, and the reactions in zone 19 proceed as follows:

$$PbO_2 + C \rightarrow CO_2 + Pb$$
$$2PbSO_4 + C \rightarrow 2Pb + 2SO_3 + CO_2$$
$$H_2SO_4 \rightarrow H_2O + SO_3$$
$$H_2O \text{ liquid} \rightarrow H_2O \text{ vapor}$$

The reduction of lead oxide is slightly exothermic. The reduction of lead sulfate is somewhat endothermic. The dissociation of sulfuric acid is endothermic, as is also the evaporation of water. As a result, the heat required to be supplied by the heating elements 17 is not great and the cost of electric resistance heating is not high.

For example, let it be assumed that the composition of a spent battery as disclosed in my above-identified copending application is approximately as follows:

|  | Lbs. |
|---|---|
| Lead metal foil | 12 |
| Lead in active masses | 24 |
| Acid-proof porous paper | 3 |
| Sulfuric acid, as such, and in lead sulfate plus the oxygen in the lead oxides plus the water in the acid | 11 |
| Total weight of spent cell | 50 |

The carbon in the cellulosic paper is accordingly about stoichiometric with regard to the lead compounds, and the products are essentially molten metallic lead and a gaseous mixture of water vapor and carbon dioxide and sulfur trioxide, the gaseous mixture leaving by the conduit 25.

From conduit 25, the gaseous affluent passes to a brick-lined acid tower with Gay Lussac packing, shown at 27. Conduit 25 is insulated and removes the gas from a point contiguous to reaction zone 19, so that the gas is at a temperature substantially above the dissociation temperature of sulfuric acid, preferably about 800° F. There is accordingly no opportunity for reassociation to sulfuric acid, and the gas enters tower 27 in an essentially dry and noncorrosive condition. Water is sprayed in by conduit 29, the temperature of the tower being about 250° F., and hot sulfuric acid at a specific gravity of about 1.28 is removed and cooled through conduit 31 for reuse in batteries. Acid at this specific gravity is in fact preferable for use in lead-acid storage batteries.

The gaseous overhead from tower 27, which is mostly carbon dioxide and water vapor, leaves through conduit 33 and passes through Cottrell precipitator 35. Water practically free from acid is returned to tower 27 through conduit 37. A packed tower may be used instead of a Cottrell precipitator. The gas leaving precipitator 35 passes through conduit 39 to a condenser cooler 41 into which water is sprayed through conduit 43. The condensate of water leaves through a conduit 45; and the gaseous overhead leaving through conduit 47 is moist carbon dioxide, which may be dried and used as relatively pure carbon dioxide.

It will of course be understood that there are appropriate thermocouples and recording thermometers at apropriate places throughout the equipment.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A method of reclaiming the materials of lead-acid storage batteries, of the type composed of lead foil, cellulosic paper, sulfuric acid and at least one member selected from the class consisting of lead oxide and lead sulfate, comprising feeding lead, cellulosic paper and sulfuric acid and at least one member selected from the class consisting of lead oxide and lead sulfate from lead-acid storage batteries to a reaction zone in the substantial absence of antimony, the carbon of the cellulosic paper being present in an amount approximately stoichiometric to reduce the lead compounds, heating the said materials in the reaction zone to a temperature to promote the reduction of the lead compounds and the dissociation of sulfuric acid, shielding the reaction zone from the entry of ambient oxidizing gases, and separately removing from the reaction zone molten lead, on the one hand, and a gaseous mixture of water vapor and carbon dioxide and sulfur trioxide, on the other hand.

2. A method as claimed in claim 1, said heat being supplied by electric resistance heating.

3. A method as claimed in claim 1, and conducting the removed gaseous mixture to a wash zone, washing the gaseous mixture with water in the wash zone, and maintaining the gaseous mixture at a temperature above the dissociation temperature of sulfuric acid prior to introduction in the wash zone.

4. A method as claimed in claim 1, and maintaining the battery materials in a closed vertical column with the reaction zone at the bottom of the column and the materials at the top of the column at a temperature substantially below the temperature of the reaction zone, and withdrawing said gaseous mixture from the column at a point substantially below the top of the column.

5. A method as claimed in claim 4, said point of withdrawal of the gaseous mixture being contiguous to the reaction zone.

6. A method as claimed in claim 4, and feeding the materials in the column downwardly by gravity from an upper portion of the column to said reaction zone.

7. A method as claimed in claim 6, and maintaining a quantity of said materials in the column above said reaction zone.

References Cited

UNITED STATES PATENTS

| | | | |
|---|---|---|---|
| 1,306,942 | 6/1919 | Berglund | 75—10 |
| 1,722,372 | 7/1929 | Hallam | 75—63 |
| 1,804,054 | 5/1931 | Hayward | 75—63 X |
| 1,809,835 | 6/1931 | Davis | 75—63 X |
| 1,938,582 | 12/1933 | Davis | 75—77 |
| 2,049,633 | 8/1936 | Thomsen | 75—77 |
| 2,797,158 | 6/1957 | Wendeborn | 75—77 |
| 2,826,490 | 3/1958 | Neumann | 75—77 |

OTHER REFERENCES

Hofman: Metallurgy of Lead, 1st ed.; McGraw-Hill, 1918, pp. 47, 67, 68. Scientific Library, TN 785 H6M.

HYLAND DIZOT, *Primary Examiner.*

H. W. TARRING, *Assistant Examiner.*